United States Patent
Farthing et al.

[11] 3,744,913
[45] July 10, 1973

[54] DEVICE FOR DETERMINING RELATIVE ANGULAR POSITION BETWEEN A SPACECRAFT AND A RADIATION EMITTING CELESTIAL BODY

[75] Inventors: Winfield H. Farthing, Lanham, Md.; Herbert F. Frisbie, Springfield, Va.

[73] Assignee: The United States of America as represented by the Administrator of the National Aeronautics and Space Administration, Washington, D.C.

[22] Filed: Feb. 24, 1972

[21] Appl. No.: 229,128

[52] U.S. Cl............. 356/141, 250/214 R, 250/209, 250/203 R
[51] Int. Cl............................................ G01b 11/26
[58] Field of Search............................ 325/323, 473; 250/214 R, 209, 207, 203 R; 356/141, 152

[56] References Cited
UNITED STATES PATENTS

| | | | |
|---|---|---|---|
| 3,657,547 | 4/1972 | Mansfield | 250/203 R |
| 3,652,791 | 3/1972 | Shuey | 250/214 R |
| 3,205,361 | 9/1965 | Albus | 250/203 R |
| 2,538,028 | 1/1951 | Mozley | 343/17.1 R |
| 3,496,481 | 2/1970 | Torick et al. | 325/473 |

*Primary Examiner*—Benjamin A. Borchelt
*Assistant Examiner*—S. C. Buczinski
*Attorney*—R. F. Kempf, John R. Manning et al.

[57] ABSTRACT

Signals indicative of the relative angular position between a spin stabilized spacecraft, probe, or sounding rocket and a radiation emitting celestial body are derived with a detector including four electrodes for deriving indications of the centroid of the radiation image on the detector. During each spin of the satellite each electrode derives a signal having a first non-zero level while the detector is not illuminated by the radiation and a sound non-zero level while it is illuminated by the radiation. The first level is indicative of dark current, while the second level is dependent upon dark current, the angular position of the centroid of the image on the detector surface relative to the electrode, and the intensity of the radiation impinging on the detector. A processing network, including a negative feedback loop, responds to the signal to derive, during each spin of the spacecraft, a signal indicative of the dark current. The dark current indicating signal is combined, in the feedback loop, with the electrode output to derive an output signal having a substantially zero value while the dark current is being generated. The image of the body is formed on the detector surface with a pinhole.

16 Claims, 3 Drawing Figures

Patented July 10, 1973 3,744,913

DEVICE FOR DETERMINING RELATIVE ANGULAR POSITION BETWEEN A SPACECRAFT AND A RADIATION EMITTING CELESTIAL BODY

ORIGIN OF INVENTION

The invention described herein was made by employees of the United States Government and may be manufactured and used by or for the Government for governmental purposes without the payment of any royalties thereon or therefor.

FIELD OF INVENTION

The present invention relates generally to devices for deriving signals indicative of the angular position between a radiation emitting celestial body and a spacecraft, probe, or sounding rocket, and, more particularly, to such a device wherein a spacecraft includes a detector for deriving signals indicative of the centroid position of a radiation image on the detector surface. Hereafter, the word spacecraft is intended to include probes and sounding rockets.

BACKGROUND OF THE INVENTION

Systems for determining the angular position between a spacecraft and a radiation emitting celestial body, such as the sun or moon, generally fall into three types; namely: analog sensors including a pair of photoconductive devices, reticle time measuring devices, and reticle digital devices.

Analog sensors employ a pair of photoconductive devices connected so that a differential output is derived from them. The differential output varies as a function of the projection angle of the vector of the radiation image on a planar surface formed by the photoconductive sensors. To provide signals varying as a function of the angular position of the radiant emitting celestial body relative to the detector surface, combinations of light baffles and sun shades are employed. In order to derive signals indicative of the angular position of the radiant source into two directions at right angles to each other, multiple sensors are required. Devices of this type require each of the photoconductive sensors to be very closely matched in order to maintain accuracy. Because of the requirement for multiple pairs of photoconductive devices to provide information indicative of the body in two orthogonal directions, considerable thermal and mechanical stability of the photoconductive devices are necessary. It can be shown that highly accurate determinations of the angular position of the radiating source are attained only if the field of view of the detector is relatively narrow, less than ten degrees of arc. Further, detectors of the photoconductive type generally have an inherently slow response time so that systems employing such detectors cannot usually be employed on spinning spacecraft. A further problem inherent with the use of photoconductive devices is that they cannot usually be employed with lenses, so that measurements of celestial bodies having relatively low light emission, such as the moon, are difficult.

The reticle time measuring system is applicable only to spinning spacecraft. A reticle containing a pattern of slits is located in front of a photocell to provide radiation pulses from the celestial body on the photocell in response to spin of the spacecraft. The time between detection of adjacent radiation pulses is measured to provide a measure of angular position. It is necessary to reference the detected time between adjacent pulses to the total spin period. While systems of this type are relatively simple and inexpensive, it has been found that the accuracy thereof is limited to measurements of only one degree of arc.

In the digital retical system, a slit retical is located in front of a binary or Gray-coded pattern of several photocell detectors. The position of the celestial body image is derived by the binary state of the several detectors in an image plane. For spinning vehicles, it is necessary to employ an auxiliary detector to indicate when radiation from the celestial body is in the sensor field of view. To provide measurements of the body in two orthogonal directions, it is necessary to employ a pair of such detectors. While digital reticle systems are inherently precise, their resolution is limited as a function of the spectral nature of the radiant energy derived from the body. For example, radiation from the sun subtends an arc of 32 minutes which can be detected with the digital type device. In order to obtain accuracies to a greater extent, for example, to one arc minute, complex and expensive interpolation schemes are required. A further problem concerned with digital reticle systems is that measurements can be derived only once during each spin cycle when they are employed on spinning spacecraft. Thereby, the amount of information which can be derived with such devices is limited, so that indications of the motion of the vehicle are not easily derived.

BRIEF DESCRIPTION OF THE INVENTION

In accordance with the present invention, the above-noted problems are avoided by employing a semiconductor detector having a fast response time and a plurality of output electrodes which derive indications of the centroid of a radiant image on the detector. The electrodes are responsive to currents derived from a detecting surface preferably having substantial length in two directions at right angles to each other. It has been found that with the device of the present invention a carefully calibrated detector is capable of yielding positional information in a pair of orthogonal coordinate directions to accuracies within one arc minute.

In one preferred embodiment, the stated accuracy is attained over an arc having a field of view of approximately 20°. Such accuracy is attained in one embodiment through the use of a pinhole image former having an area no greater than approximately one-tenth the area of the detector surface. If the area of the pinhole is increased appreciably beyond one-tenth the area of the detector surface, system resolution is decreased, precluding the ability to derive centroid information to one minute of arc. If the pinhole area is made excessively small, the amount of light reaching the detector surface is generally excessively low, whereby the signal to noise ratio of the detector output signal may drop to an intolerable level. While the pinhole configuration is preferred because of its simplicity and high resolution, in many instances other image forming devices, employing optical gain (such as collimating lenses), may be employed.

A problem in processing the output signal of a detector is the appreciable dark current always derived at the output electrodes. The dark current is stabilized to a certain extent by providing thermal control for a substantially light tight housing in which the detector is maintained. The detector dark current, however, is susceptible to change as a function of time and other factors. Hence, it has generally been found that it is necessary to detect the dark current level and subtract it from the output signal of each electrode. To this end, the signal derived from each electrode is chopped periodically. If the spacecraft includes means for maintaining it in a spin stabilized configuration, chopping is performed in response to the spacecraft spinning motion. If the spacecraft is of the non-spin or very low spin type, chopping is effected by rotating a reticle in front of the detector. While the radiation is being blocked due to the chopping action and the detector is generating dark current, the level of the output signal of the detector is determined. This level is combined in a feedback loop with the electrode output signal to derive an output signal having substantially zero level while no radiation from the source impinges on the detector. While the detector is illuminated by the radiation, the feedback loop output signal has a level commensurate with the intensity of the radiation impinging on the detector and the position of the image centroid relative to the electrode, with dark current offset removed. In addition to limiting the offset induced by the dark current, this technique provides greater dynamic range for the device because the ratio of the information signal level to the signal level while the detector is not illuminated becomes substantially infinite.

In accordance with one feature of the invention, the dark current is fed to the feedback loop only when the detector is not illuminated by the radiation. To this end, the feedback loop includes a storage capacitor fed through a normally closed switch by the output signal of a channel including the feedback loop. The switch is open circuited in response to the detector providing an indication that it is being illuminated by the radiation.

A further feature of the invention involves sampling the output signal of each electrode channel several times during each spin of the spacecraft about the radiating body. Thereby, the motion of the spacecraft relative to the body is accurately ascertained in a relatively short time. Sampling is performed on a periodic basis, whereby each channel is sampled at the same time, Simultaneous sampling of all channels substantially avoids errors resulting from relative motion between the spacecraft and the radiating body.

In accordance with still another feature of the invention, output signals from each of the electrode channels are fed to a single output channel via a time multiplexer. The single output channel is of the variable gain type to enable the detector to be employed with radiation sources having different intensities. Thus, moon tracking can be performed despite the significant changes in the intensity of radiation from the moon which result from its different phases. The use of a single variable gain channel responsive to the several electrode channels reduces the possibility of differing gain factors being introduced in the several channels.

It is, accordingly, an object of the present invention to provide a new and improved device for enabling the angular position between a radiating source and a spacecraft to be ascertained.

Another object of the invention is to provide a device for enabling the relative position between a radiating, celestial body to be determined relative to a spacecraft, wherein the spacecraft includes a detector for deriving signals indicative of the centroid position of an image of the body on the detector surface.

A further object of the invention is to provide a relatively inexpensive device for enabling the position of a radiating celestial body to be determined on a spacecraft to within approximately one minute of arc.

A further object of the invention is to provide a new and improved system for enabling the angular position of a radiation emitting celestial body to be determined on a spacecraft, wherein the effects of dark current on the output signal of a detector are substantially eliminated.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
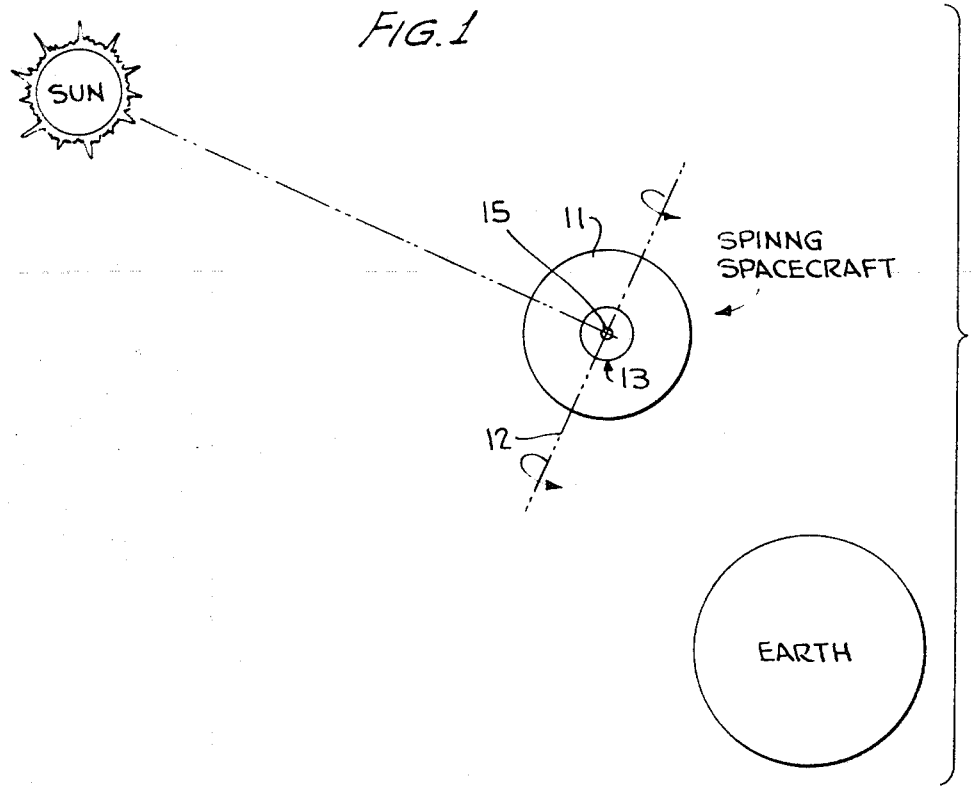
FIG. 1 is a schematic diagram illustrating the position of the detector in accordance with the present invention on a spinning spacecraft relative to the sun.
Figure 2:
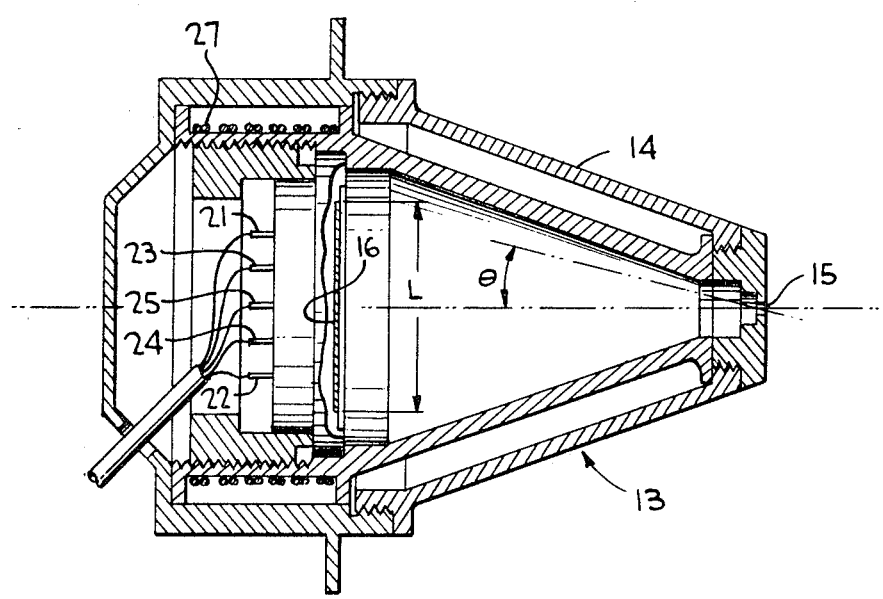
FIG. 2 is a cross-sectional view of one preferred embodiment of a detector mounted on the spacecraft of FIG. 1.

Reference is now made to FIG. 1 of the drawing wherein there is illustrated a spin stabilized spacecraft 11 including the usual means (not shown) for causing the spacecraft to spin about its own vertical axis 12. The spacecraft is in orbit about a local celestial body, such as earth, so that its angular position relative to a celestial body a great distance from it, such as the sun or moon, is variable. To determine the angular position of spacecraft 11 relative to the body, the spacecraft is provided with a radiation detector 13. The optical axis of the detector is elevated from the spin plane such that the celestial body falls within the field of view of the sensor over one segment of each spin. In some cases it may be desirable to have a multiplicity of detectors to obtain a greater composite field of view without reduced accuracy.

Figure 3:
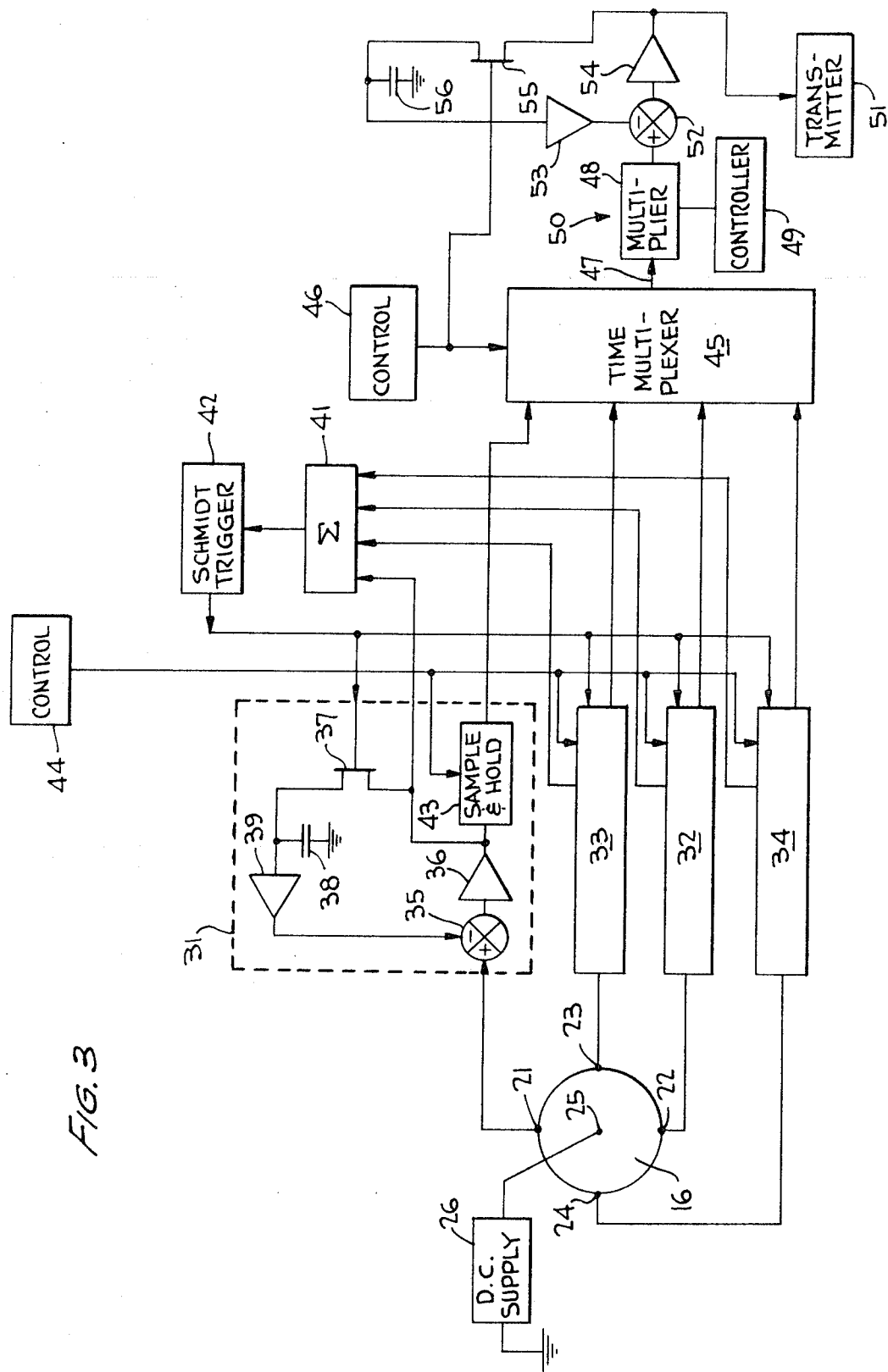
FIG. 3 is a circuit diagram of a preferred embodiment of the processing electronics employed in conjunction with the detector of FIG. 2.

Detector 13 is mounted in a housing 14 that is opaque to optical radiation from the body, except for a pinhole 15 that is provided at one end of the housing. Positioned behind pinhole 15 is planar, semiconducting detecting surface 16 that has substantial lengths in one direction for single dimension application, or in two directions at right angles to each other for two dimensional applications. Preferably, the detector surface 16 is included in a commercially available device from a number of sources, such as the "SC" series of detectors manufactured by United Detector Technology. Surface 16 can either be of circular configuration, as illustrated in FIG. 3, or it can be formed as a square. For one dimensional application it is linear. Detector surface 16 is provided with a number (two or more) of spaced electrodes for deriving signals indicative of the centroid position of the radiation emitting body, as imaged on the surface by pinhole 15. In one preferred embodiment, detecting surface 16 is a PIN silicon photodiode having a very fast response, ranging from a few nanoseconds up to less than 10 microseconds. Preferably, detecting surface 16 includes four output electrodes 21–24, positioned orthogonally to each other on the periphery of the surface, and a single, centrally located input electrode 25 that is connected to one terminal of d.c. power supply 26, the terminal of which is grounded.

Detector 16 responds to the relatively small light spot imaged on its surface by pinhole 15 to derive at terminals 21–24 signals indicative of the centroid of the image relative to the electrode positions. Thereby, the difference between the output signals of electrodes 21 and 22 provides an indication of the centroid position of the image on detector surface 16 in a first coordinate direction (along a Y-axis) and the difference between the output signals at the electrodes 23 and 24 provides an indication of the centroid position of the image in a direction at right angles to the first coordinate direction (along an X-axis).

The magnitude of voltages derived at electrodes 21–24 is also indicative of the intensity of the radiation impinging on detector surface 16, and dark current flowing in the detector. Dark current is an offset current value that has a d.c. level dependent upon internal conditions, such as temperature and age, of the detector surface 16. The dark current is, thereby, subject to long term fluctuations which cannot be predicted on a predetermined basis. Dark current fluctuations are minimized to a certain extent by stabilizing the temperature of the detector surface 16. To this end heater coils 27 are located in proximity to surface 16 and supplied with a regulated current.

The area of detector surface 16 and the spacing between the plane in which the detector surface is located relative to pinhole 15 are such that there is an appreciable field of view (on the order of 20° in a typical embodiment) for the detector. The field of view, $\theta$, is determined by the diameter of detector surface 16 ($L$) and the distance of surface 16 from pinhole 15 ($d$) as: $\theta = \tan^{-1} L/(2d)$. To provide accuracies to within one minute of arc over the 20° field of view of detector surface 16, the area of pinhole 15 is no greater than approximately one-tenth the surface area of the detector surface. In one particular embodiment, the pinhole diameter is approximately one thirty-second inch and the detector diameter is approximately three-fourths inch. The maximum and minimum relationships between the pin and detector areas are governed by accuracy and signal to noise ratio at each electrode. If the pinhole area is greater than approximately one-tenth of the detector surface area the radiation image on the detector surface 16 is excessively large and may be so diffuse that the ability to drive signals accurately representing the centroid position is reduced. If the pinhole area is too small the total sunlight incident on the photocell will not be sufficient to maintain an adequate signal to noise ratio.

In order to provide accurate indications of the relative angular position between spacecraft 11 and the body, to within 1 minute of arc in the 20° field of view, it is necessary for the output signals derived from electrodes 21–24 to be processed in a manner to accurately remove the dark current offset thereon. To this end, the output signal of each of electrodes 21–24 is fed to a separate signal processing channel; channels 31–34 being respectively provided for electrodes 21–24. Since each of channels 31–34 is substantially the same, a description of channel 31 suffices for the remainder.

While no radiation to which the detecting surface is responsive is in the field of view of radiation detecting surface 16, electrode 21 derives a finite, non-zero d.c. output signal voltage level indicative of the detector dark current. In response to radiation from the body impinging on the detector surface 16, the voltage at electrode 21 increases to a d.c. value equal to the sum of the dark current plus a magnitude that is a function of the intensity of the radiation impinging on the detector surface and the position of the image on the detector surface. The two d.c. voltage levels are derived in sequence during each spin of the spacecraft while detector surface 16 is being illuminated by the body. Hence, the spin of the spacecraft provides a cyclic chopping of the radiant energy that impinges on detector surface 16.

The output signal of electrode 21 is fed to one input terminal of difference node 35 of channel 31. A second input to node 35 is responsive to a feedback signal derived from the output of channel 31. Node 35 derives a difference signal that is fed to wide band amplifier 36 which derives an output signal that is fed through a normally closed switch 37 to storage capacitor 38. Normally closed switch 37 preferably is the source drain path of a field effect transistor having a gate electrode that is normally biased so that a very low impedance exists between the source and drain electrodes. Capacitor 38 is connected through isolating amplifier 39 to the second input terminal of node 35, whereby the node derives an output signal that is at all times equal to the difference between the signal derived from electrode 21 and the signal stored by capacitor 38. The signal stored by capacitor 38 is indicative of the dark current derived from detector surface 16 since the capacitor is connected with the output terminal of amplifier 36 at all times except while detector surface 16 is being illuminated, and thereby remains substantially constant throughout the interval of each spin of spacecraft 11.

To control switch or field effect transistor 37, the outputs of each of channels 31–34, as derived from amplifiers 36 thereof, are linearly combined in summation network 41. The amplitude of the output signal of summation network 41 is thereby directly proportional to the total radiant energy of the image on detector surface 16. Schmidt trigger 42 responds to the output of summation network 41 to derive a signal that pinches off the source drain path of field effect transistors 37 in each of channels 31–34 to establish a high impedance, open circuit switch condition. The Schmidt trigger remains operative as long as the output signal of summation amplifier 41 exceeds a predetermined, threshold value indicative of a certain radiation image level on a detector surface 16. After radiation from the sun or other celestial body being tracked is no longer impinging on detector surface 16, the level of the output signal of summation circuit 41 drops below the threshold value of Schmidt trigger 42 and the source drain path of the field effect transistor 37 in each of channels 31–34 is restored to a low impedance. Thereby, the voltage level on capacitor 38 remains substantially constant throughout the interval of each spin of spacecraft 11 about vertical axis 12, at a level commensurate with the dark current derived from electrode 21 to which it is responsive. This voltage level is continuously fed through amplifier 39 to difference node 35, whereby the effect of offset is substantially eliminated in the output of channels 31–34 throughout each spin of the spacecraft.

To provide an accurate indication of the angular position of the spacecraft relative to the body, it is preferable to continuously monitor the output of each of channels 31–34. Due to modern telemetering constraints in spacecraft to earth based communication links, however, it is necessary to sample the output of channels 31–34 and feed these samples on a time multiplex basis to a single transmitter. To this end, the output signals of channels 31–34, as derived at the output terminals of amplifiers 36 in each channel, are fed to sample and hold networks 43 of the respective channels. The sample and hold networks 43 of each of channels 31–34 are simultaneously activated in response to control signals from multiplex controller 44 to the sample condition to prevent motion induced errors since all of the signals for a particular multiplex frame are combined at the ground station to provide an indication of spacecraft position during that frame. The sampling rate of sample and hold networks 43 of channels 31–34 is much greater than the spin rate of spacecraft 11 about axis 12 to approximate the continuous derivation of signals from electrodes 21–24. In an exemplary case, spacecraft 11 spins about axis 12 at a rate of six times per second, while signals are sampled by networks 43 250 times per second in response to signals derived by controller 44.

The signals stored or held by networks 43 are sequentially fed at different times during each multiplex frame through time multiplexer 45 to a variable gain output channel 50 having a discrete number of predetermined gain factors. Time multiplexer 45 is responsive to control circuit 46 so that signals are read from sample and hold networks 43 at the same rate as the networks sample the output signals of channels 31–34. Multiplexer 45 feeds the four input signals thereof to a single output lead 47 which drives multiplier 48. Multiplier 48 sets the gain of output channel 50 so that the variable intensity of the radiation emitted by the celestial body, as impinging on detector 16, is partially removed from the output signal of channel 50. In this manner, almost the full dynamic range of the output signal is maintained for wide range of light levels.

Multiplier 48 functions as a variable gain device having a signal input from multiplexer 45 and a gain control input responsive to controller 49, that has a number of predetermined, selectable output levels determined by the known intensity of the radiation image detected by detector surface 16. If detector surface 16 is responsive to radiation from the sun, multiplier 48 can be omitted since solar radiant energy impinging on surface 16 can be considered constant. If, however, the detector surface 16 is responsive to lunar radiant energy images, controller 49 introduces variable gain factors to control the amplitude of the multiplication factor of multiplier 48. The magnitude of the gain factors depends on the lunar phase. The controller 49 utilizes the sum of outputs of the sample and hold circuits to determine the required gain setting by comparing the product of the sum and the gain setting to a full scale output, and adjusting the gain until proper signal levels are obtained.

There is a tendency for offset to be introduced by time multiplexer 45 and the circuitry of channel 50. To eliminate such offset, output channel 50 is provided with an electronic circuit similar to that employed in each of channels 31–34. The output channel offset removing circuit includes differential or subtraction node 52, having one input responsive to the output of multiplier 48 and a second input responsive to a feedback signal derived from isolating amplifier 53. The difference output signal of node 52 drives an input terminal of amplifier 54, the output of which is connected through the source drain path of field effect transistor 55 to storage capacitor 56. Field effect transistor 55 includes a gate electrode responsive to control network 46 for time multiplexer 45. When control network 46 activates multiplexer 45 so that no signals are fed through the multiplexer to lead 47, it biases the gate electrode of field effect transistor 55 so that low impedance is provided between the source drain electrodes of the field effect transistor, whereby capacitor 56 is responsive to any finite, non-zero voltage that might be derived at the output terminal of amplifier 54 during this interval. When control noetwork 46 activates multiplexer 45 so that the output signal of one of channels 31–34 is fed through the multiplexer to multiplier 48, it applies a bias voltage to the gate electrode of field effect transistor 55 to pinch off the field effect transistor source drain path. Thereby, the finite, signal level indicating output voltage of amplifier 54 is decoupled from capacitor 56 so that the capacitor voltage is unaffected by the finite position indicating signal level derived from multiplier 48 and the capacitor continuously feeds a voltage to node 52 indicative of the finite offset voltage of multiplexer 54 and channels 50.

To obtain accuracies to within one minute of arc within a 20° field of view, it is been found necessary to calibrate presently available commercial semiconductor devices employed as detector surface 16. Calibration is performed by placing detector 13 on a calibration table with a suitable light source and incrementally rotating the detector so that the detector surface 16 is moved to a very large number of points in the 20° field of view. In one calibration scheme, 1,600 different points were actually employed. To provide the desired accuracy, the output signals of amplifier 54, as sequentially derived from channels 31–34 for each for the sampled points in the field of view, are combined to derive positional information for the X and Y-axes in accordance with:

$$(V_{x_1} - V_{x_2})/(V_{x_1} + V_{x_2} + V_{y_1} + V_{y_2}) \quad (1)$$

and $$(V_{y_1} - V_{y_2})/(V_{x_1} + V_{x_2} + V_{y_1} + V_{y_2}) \quad (2),$$

where:

$V_{x_1}$ equals the output voltage of amplifier 54 for channel 33;

$V_{x_2}$ equals the output voltage of amplifier 54 for channel 34;

$V_{y_1}$ equals the output voltage of amplifier 54 for channel 31; and $V_{y_2}$ equals the output voltage of amplifier 54 for channel 32.

In Equations (1) and (2) there is included a denominator factor proportional to the sum of the responses of channels 31–34 while detector surface 16 is illuminated to provide normalization of the different signals for intensity variations of the light source illuminating surface 16.

Depending upon the accuracy required, calibration may be performed by analog or digital techniques. Data derived from detector 16 during actual use while it is desired to measure the position of spacecraft 11 relative to the sun or moon can be compared with the calibration data to derive the position information by manual or computer techniques.

While there has been described and illustrated one specific embodiment of the invention, it will be clear that variations in the details of the embodiment specifically illustrated and described may be made without departing from the true spirit and scope of the invention as defined in the appended claims.

We claim:

1. A device for deriving signals indicative of the relative angular position of a radiation emitting celestial body and a spinning spacecraft comprising a detector for the radiation, means for forming a radiation image of the body on the detector, said image having an area much less than the detecting surface of the detector, said detector deriving a first signal having a first nonzero level while said detector is not illuminated by said radiation and a second non-zero level while it is illuminated by said radiation, said first level being subject to change in response to internal conditions of the detector, said second level being dependent upon: the internal conditions, the position of the centroid of said image on the detector surface, and the intensity of said radiation impinging on the detector; said first and second levels being derived in sequence during each spin of the spacecraft, means responsive during each spin to the first signal for deriving a second signal having a level proportional to the first level, said second signal remaining substantially constant throughout the interval of each spin, and means combining the first and second signals for deriving a third signal having a substantially zero level while the first level is being derived and a third level substantially proportional to the difference between the first and second levels while the second level is being derived.

2. The device of claim 1 further including means for multiplying the third signal by a level indicative of the intensity of the source.

3. The device of claim 2 wherein the source is subject to intensity variations, and means for changing the multiplication level as a function of the intensity variations.

4. The device of claim 1 wherein said image forming means is a pinhole having an area no greater than approximately one-tenth the area of the detecting surface.

5. A device for deriving signals indicative of the relative angular position of a radiation emitting celestial body and a spinning spacecraft comprising a detector for the radiation, means for forming a radiation image of the body on the detector, said image having an area much less than the detecting surface of the detector, said detector having a planar detecting surface with substantial lengths in two directions at right angles to each other, said detector including a plurality of output electrodes, said plurality being greater than two, said electrodes being spaced relative to said surface so that at each of them there is derived a signal having a first non-zero level while said detector is not illuminated by said radiation and a second non-zero level while it is illuminated by said radiation, said first level being subject to change in response to internal conditions of the detector, said second level being dependent upon: the internal conditions, the position of the centroid of said image on the detector surface relative to the electrode, and the intensity of said radiation impinging on the detector; the relative amplitudes of the second levels derived from the plural electrodes providing an indication of the position of the detector and image in two directions at right angles to each other, said first and second levels being derived in sequence during each spin of the spacecraft, means, for each electrode, responsive during each spin to the first signal for deriving a second signal having a level proportional to the first level, said second signal remaining substantially constant throughout the interval of each spin, and means, for each electrode, combining the first and second signals for deriving a third signal having a substantially zero level while the first level is being derived and a third level substantially proportional to the difference between the first and second levels while the second level is being derived.

6. The device of claim 5 wherein the second signal deriving means for each electrode includes: signal storage means normally responsive to said first signal, and means responsive to the detector being illuminated by the source for decoupling the first signal from the storage means.

7. The device of claim 5 wherein each of the signals is d.c., and the second and third signal deriving means for each electrode includes: a feedback network having an input responsive to the first signal, means responsive to the first and second signals for deriving a d.c. difference signal, means for amplifying the difference signal to derive the third signal, a storage capacitor for deriving the second signal, switch means for normally feeding the third signal to the storage capacitor, and means responsive to the detector being illuminated by the source for activating the switch means to prevent the third signal from being fed to the storage capacitor while the detector is being illuminated by the body.

8. The device of claim 7 wherein the means for activating is responsive to the third signals for all of said electrodes.

9. The device of claim 5 further including means for periodically sampling, at a frequency much greater than the spin frequency, the third signal for all of said electrodes at substantially the same time.

10. The device of claim 9 further including means for separately storing the sampled signal for each electrode, means for time multiplexing the stored sampled signals, and a single variable gain output channel responsive to the time multiplexing means, said output channel including means for multiplying each of the third signals by a level indicative of the intensity of the source.

11. The device of claim 10 wherein the source is subject to intensity variations, and means for changing the multiplication level as a function of the intensity variations.

12. The device of claim 11 wherein said output channel introduces an offset so that it derives a signal having a finite, non-zero value while none of the third signals is fed through the multiplexing means, and means responsive to the signal derived by the channel for removing the offset from it.

13. The device of claim 5 wherein said image forming means is a pinhole having an area no greater than approximately one-tenth the area of the detecting surface.

14. A device for deriving signals indicative of the relative angular position of a radiation emitting celestial body and a spacecraft comprising a detector for the radiation, means for forming a radiation image of the body on the detector, said image having an area much less than the detecting surface of the detector, said detector deriving a first signal having a first non-zero level while said detector is not illuminated by said radiation and a second non-zero level while it is illuminated by said radiation, said first level being subject to change in response to internal conditions of the detector, said second level being dependent upon: the internal conditions, the position of the centroid of said image on the detector surface, and the intensity of said radiation impinging on the detector; said spacecraft including means for cyclically chopping the radiation illuminating the detector so that said first and second values are derived in sequence during each chopping cycle while the radiation is respectively blocked and passed by the chopping means, means responsive only to the first signal for deriving a second signal having a level proportional to the first level, said second signal remaining substantially constant throughout a complete chopping cycle, and means combining the first and second signals for deriving a third signal having a substantially zero level while the first level is being derived and a third level substantially proportional to the difference between the first and second levels while the second level is being derived.

15. A system for deriving signals indicative of the angular position of a radiation emitting celestial body and a spacecraft comprising a detector for the radiation, means for forming a radiation image of the body on the detector, said image having an area much less than the detecting surface of the detector, said detector having a planar detecting surface with substantial lengths in two directions at right angles to each other, said detector including a plurality of output electrodes, said plurality being greater than two, said electrodes being spaced relative to said surface so that at each of them there is derived a signal having a first non-zero level while said detector is not illuminated by said radiation and a second non-zero level while it is illuminated by said radiation, said first level being subject to change in response to internal conditions of the detector, said second level being dependent upon: the internal conditions, the position of the centroid of said image on the detector surface relative to the electrode, and the intensity of said radiation impinging on the detector; the relative amplitudes of the second levels derived from the plural electrodes providing an indication of the position of the detector and image in two directions at right angles to each other, said spacecraft including means for cyclically chopping the radiation illuminating the detector so that said first and second values are derived in sequence during each chopping cycle while the radiation is respectively blocked and passed by the chopping means, means responsive only to the first signal for deriving a second signal having a level proportional to the first level, said second signal remaining substantially constant throughout a complete chopping cycle, and means, for each electrode, combining the first and second signals for deriving a third signal having a substantially zero level while the first level is being derived and a third level substantially proportional to the difference between the first and second levels while the second level is being derived.

16. A device for deriving signals indicative of the angular position of a radiation emitting celestial body comprising a spacecraft, a detector for the radiation positioned on the spacecraft, means for forming a radiation image of the body on the detector, said image having an area much less than the detecting surface of the detector, said detector having a planar detecting surface with substantial lengths in two directions at right angles to each other, said detector including a plurality of output electrodes being spaced relative to said surface so that at each of them there is derived a signal having a first non-zero level while said detector is not illuminated by said radiation and a second non-zero level while it is illuminated by said radiation, said first level being subject to change in response to internal conditions of the detector, said second level being dependent upon: the internal conditions, the position of the centroid of said image on the detector surface relative to the electrode, and the intensity of said radiation impinging on the detector, the relative amplitudes of the second levels derived from the plural electrodes providing an indication of the position of the detector and image in two directions at right angles to each other, wherein said image forming means is a pin hole having an area no greater than approximately one-tenth the area of the detecting surface.

* * * * *